(12) United States Patent
Wang et al.

(10) Patent No.: US 9,904,096 B2
(45) Date of Patent: Feb. 27, 2018

(54) LIQUID CRYSTAL PANEL AND DUAL-VISION LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Mengjie Wang, Beijing (CN); Yuqiong Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/021,984

(22) PCT Filed: Sep. 30, 2014

(86) PCT No.: PCT/CN2014/088014
§ 371 (c)(1),
(2) Date: Mar. 15, 2016

(87) PCT Pub. No.: WO2016/004685
PCT Pub. Date: Jan. 14, 2016

(65) Prior Publication Data
US 2016/0223860 A1 Aug. 4, 2016

(30) Foreign Application Priority Data
Jul. 9, 2014 (CN) .......................... 2014 1 0325331

(51) Int. Cl.
*G02F 1/1333* (2006.01)
*G02F 1/1335* (2006.01)
(Continued)

(52) U.S. Cl.
CPC ...... *G02F 1/133514* (2013.01); *G02F 1/1368* (2013.01); *G02F 1/133345* (2013.01);
(Continued)

(58) Field of Classification Search
CPC ......... G02F 1/133514; G02F 1/133345; G02F 1/133512
(Continued)

(56) References Cited

U.S. PATENT DOCUMENTS

2002/0196393 A1* 12/2002 Tashiro ................. G02F 1/1303
349/106
2012/0099215 A1 4/2012 Wu
(Continued)

FOREIGN PATENT DOCUMENTS

CN 101571631 A 11/2009
CN 101655622 A 2/2010
(Continued)

OTHER PUBLICATIONS

Machine Translated KR 101212162B1.*
(Continued)

*Primary Examiner* — Lucy Chien
(74) *Attorney, Agent, or Firm* — Ladas & Parry LLP

(57) ABSTRACT

A liquid crystal panel and a dual-vision crystal display device can increase the viewing angle of the dual-vision crystal display device and reduce the thickness and cost of the dual-vision crystal display device. The liquid crystal panel includes an opposing substrate, an array substrate and a liquid crystal layer disposed between the opposing substrate and the array substrate; the opposing substrate includes: an upper polarizer, an upper base substrate disposed on one side of the upper polarizer, which side faces the array substrate, and a black matrix grating disposed on one side of the upper base substrate, which side faces the
(Continued)

array substrate; the array substrate includes: an lower polarizer, an lower base substrate disposed on one side of the lower polarizer, which side faces the opposing substrate, and a color filter layer disposed on one side of the lower base substrate, which side faces the opposing substrate; and the liquid crystal layer is disposed between the color filter layer and the black matrix grating.

12 Claims, 4 Drawing Sheets

(51) Int. Cl.
 *G02F 1/1362* (2006.01)
 *G02F 1/1368* (2006.01)
(52) U.S. Cl.
 CPC .. *G02F 1/133512* (2013.01); *G02F 1/133528* (2013.01); *G02F 1/136209* (2013.01); *G02F 1/136286* (2013.01); *G02F 2001/136222* (2013.01)
(58) Field of Classification Search
 USPC .......................................................... 349/110
 See application file for complete search history.

(56) References Cited

U.S. PATENT DOCUMENTS

| 2014/0111750 A1 | 4/2014 | Li et al. |
| 2014/0146261 A1 | 5/2014 | Wu |
| 2016/0033778 A1 | 2/2016 | Lin et al. |

FOREIGN PATENT DOCUMENTS

| CN | 102236201 A | 11/2011 |
| CN | 102629607 A | 8/2012 |
| CN | 102768424 A | 11/2012 |
| CN | 103499898 A | 1/2014 |
| JP | 2005-215372 A | 8/2005 |
| JP | 2005-321449 A | 11/2005 |
| KR | 101212162 B1 | 12/2012 |
| KR | 101338618 B1 | 12/2013 |

OTHER PUBLICATIONS

Second Chinese Office Action dated Sep. 8, 2016; Appln. No. 201410325331.2.
International Search Report and Written Opinion dated Apr. 16, 2015; PCT/CN2014/088014.
First Chinese Office Action dated Apr. 22, 2016, Appln. No. 201410325331.2.

* cited by examiner

LIQUID CRYSTAL PANEL AND DUAL-VISION LIQUID CRYSTAL DISPLAY DEVICE

TECHNICAL FIELD

An embodiment of the present disclosure relates to a liquid crystal panel and a dual-vision liquid crystal display device.

BACKGROUND

A dual-vision display technology is a display technology that different images can be seen at two sides (such as the left and right sides) of a display panel. As shown in FIG. 1, a left view area and a right view area are provided on a display screen, and can display different images at a same time; a left view image is displayed in the left view area, and the right view image is displayed in the right view area, so that different images can be seen by different viewers in different directions of the same display panel. However, a crosstalk area exists between the left view area and the right view area. So far, a dual-vision display technology is realized by the way of attaching a slit grating on the outside of a display panel.

SUMMARY

An embodiment of the present disclosure provides a liquid crystal panel and a dual-vision crystal display device which can increase the viewing angle of the dual-vision crystal display device and reduce the thickness and cost of the dual-vision crystal display device at the same time.

At least one embodiment of the present disclosure provides a liquid crystal panel, comprising an opposing substrate, an array substrate and a liquid crystal layer disposed between the opposing substrate and the array substrate; the opposing substrate comprises: an upper polarizer, an upper base substrate disposed on one side of the upper polarizer, which side faces the array substrate, and a black matrix grating disposed on one side of the upper base substrate, which side faces the array substrate; the array substrate comprises: an lower polarizer, an lower base substrate disposed on one side of the lower polarizer, which side faces the opposing substrate, and a color filter layer disposed on one side of the lower base substrate, which side faces the opposing substrate; and the liquid crystal layer is disposed between the color filter layer and the black matrix grating.

In one embodiment, the array substrate comprises a plurality of pixel units defined by gate lines and data lines intersected with each other; the black matrix grating comprises a plurality of shielding areas and a plurality of opening areas arranged alternately, wherein the opening areas correspond to pixel units in odd columns or pixel units in even columns, and the shielding areas correspond to pixel units in even columns or pixel units in odd columns.

In one embodiment, the pixel units comprise a plurality of sub-pixel units with different colors; each opening area further comprises a sub-shielding area disposed between adjacent sub-pixel units.

In one embodiment, a gate line shielding area is disposed on the black matrix grating at the location corresponding to the gate line of the array substrate.

In one embodiment, a distance between the color filter layer and the black matrix grating is 3 to 4 micrometers.

In one embodiment, a thin film transisor unit, a first insulating layer, the color filter layer, a second insulating layer and a pixel electrode layer are disposed on the lower base substrate in sequence.

At least one embodiment of the present disclosure further provides a dual-vision liquid crystal display device comprising the liquid crystal panel mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 2:
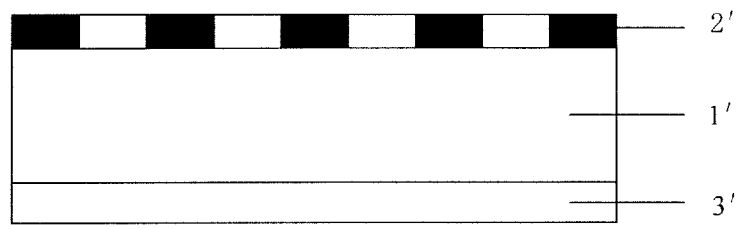
FIG. 2 is a structure schematic view of a dual-vision liquid crystal display device.
Figure 3:
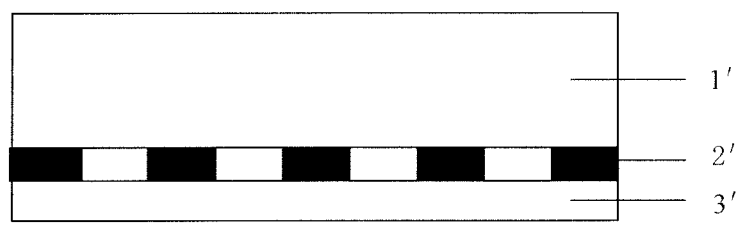
FIG. 3 is a structure schematic view of another dual-vision liquid crystal display device.

FIG. 2 is a structure schematic view of a dual-vision liquid crystal display device; FIG. 3 is a structure schematic view of another dual-vision liquid crystal display device.

Referring to FIG. 2, a slit grating 2' is bonded on the light exiting side of a display panel 1', and a backlight 3' provides a light source for the display panel 1'; or referring to FIG. 3, a slit grating 2' is bonded on the light entering side of a display panel 1', i.e., it is disposed between a display panel 1' and a backlight 3' which provides a light source for the display panel 1'. However, a tolerance usually exists in the bonding process, and even slight deviation between the position of the slit grating and the position of the display panel can affect the dual-vision display effect; therefore, ensuring the error to be controlled in a certain range increases the difficulty in manufacturing the dual-vision liquid crystal panel. And in order to make the light exiting from the silt grating 2' possess a large angle with respect to the normal of the silt grating, that is, in order to obtain a larger viewing angle and to insure that a smaller crosstalk area is provided, for instance, the color filter substrate or the array substrate (usually made of glass) of the liquid crystal panel 1' needs to experience a thinning process in the actual operation; a thickness of the respective substrate is usually reduced up to dozens of microns or about one hundred microns. The thinning process for the color filter substrate or the array substrate further increases the difficulty in manufacturing the dual-vision liquid crystal panel.

As for the problem mentioned above, a technical solution is provided. The solution includes that a transparent layer (such as SiNx) is deposited on the slit grating firstly; then a color filter layer is provided on the transparent layer; the gratings of the silt grating are arranged at intervals of sub-pixel column(s). So that, the color filter layer and the slit grating layer are disposed on a same substrate. But the thickness of the display device is still increased because a transparent layer is added.

Therefore, if the silt grating is bonded on the outer surface of the display panel, the difficulty in manufacturing the display panel is increased; if the color filter layer and the slit grating are manufactured on a same substrate, the thickness of the display device is increased because a transparent layer need to be added between the color filter layer and the slit grating layer.

At least one embodiment of the present disclosure provides a liquid crystal panel and a dual-vision crystal display device which can increase the viewing angle of the dual-vision crystal display device and reduce both the thickness and the cost of the dual-vision crystal display device.

Figure 4:
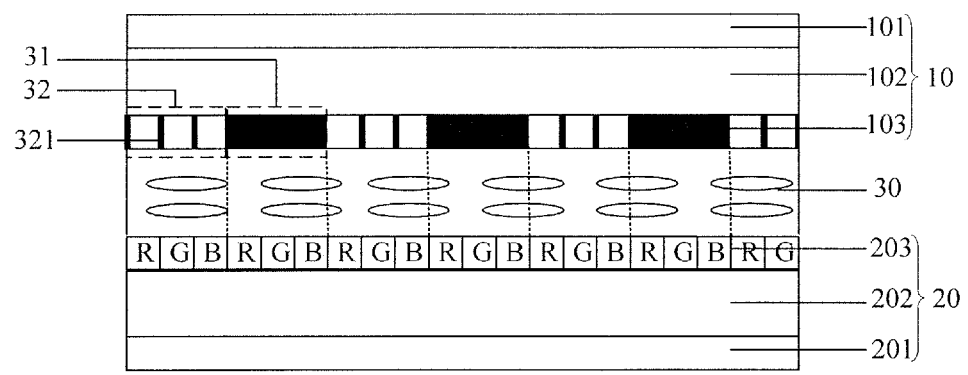
FIG. 4 is a structure schematic view of a liquid crystal panel according to an embodiment of the present disclosure.

As shown in FIG. 4, an embodiment of the present disclosure provides a liquid crystal panel which comprises an opposing substrate 10, an array substrate 20, and a liquid crystal layer 30 disposed between the opposing substrate and the array substrate; the opposing substrate 10 comprises an upper polarizer 101, an upper base substrate 102 disposed on one side of the upper polarizer 101, which side faces the array substrate 20, and a black matrix grating 103 disposed on one side of the upper base substrate, which side faces the array substrate 20. The array substrate comprises a lower polarizer 201, a lower base substrate 202 disposed on one side of the lower polarizer, which side faces the opposing substrate, and a color filter layer 203 disposed on one side of the lower base substrate, which side faces the opposing substrate. The liquid crystal layer 30 is disposed between the color filter layer 203 and the black matrix grating 103.

In the liquid crystal panel according to an embodiment of the present disclosure, a liquid crystal layer 30 is disposed between the black matrix grating 103 and the color filter layer 203, and no extra transparent layer needs to be added, thus reducing the thickness and the cost of the dual-vision crystal display device; in addition, because the thickness of the liquid crystal layer 30 is small, the distance between the black matrix grating 103 and the color filter layer 203 is small, and the angle between the light finally emitting out and the direction of normal increases. Thus, when it is applied in a dual-vision crystal display device, the viewing angle of the dual-vision crystal display device is increased significantly.

Figure 5:
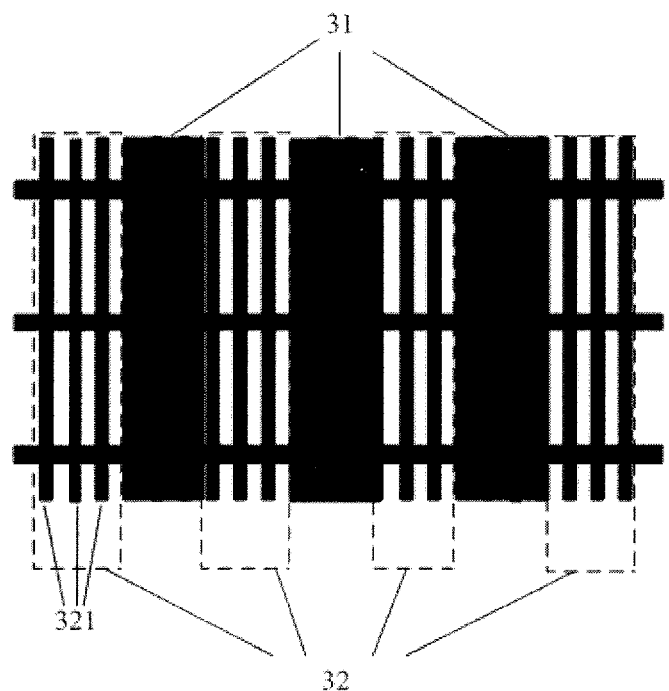
FIG. 5 is a structure schematic view of a black matrix grating of the liquid crystal panel as shown in FIG. 4.

In at least one embodiment of the present disclosure, the array substrate 20 comprises a plurality of pixel units defined by gate lines and data lines intersected with each other; for instance, each pixel unit comprises a pixel electrode and a thin film transistor serving as a switching element for controlling charging or discharging of the pixel electrode. As shown in FIG. 4 and FIG. 5, the black matrix grating 103 comprises a plurality of shielding areas 31 and a plurality of opening areas 32 arranged alternately. For example, as shown in FIG. 4, the opening areas 32 correspond to pixel units in odd columns, and the shielding areas 31 correspond to pixel units in even columns. Or, in another example, the opening areas 32 correspond to pixel units in even columns, and the shielding areas 31 correspond to pixel units in odd columns.

The pixel units can comprise a plurality of sub-pixel units of different colors. For example, as shown in FIG. 4, red sub-pixel units R, green sub-pixel units G and blue sub-pixel units B are comprised; each opening area furhter comprises sub-shielding areas 321 disposed between adjacent sub-pixel units. Further with reference to FIG. 4 and FIG. 5, sub-shielding areas 321 are disposed between sub-pixel units R and sub-pixel units G, and also sub-shielding areas 321 are disposed between sub-pixel units G and sub-pixel units B.

In a preferable embodiment, a gate line shielding area is disposed on the black matrix grating 103 at the location corresponding to the gate line of the array substrate 20. Here, the gate line shielding area disposed for the gate line can be formed in a conventional way, which is not repeated herein.

In one embodiment, a distance between the color filter layer 203 and the black matrix grating 103 is 3 to 4 micrometers. For example, an alignment layer disposed between the liquid crystal layer 30 and the color filter layer 203, an alignment layer 204 disposed between the liquid crystal layer 30 and the black matrix grating 103, and the liquid crystal layer 30 are interposed between the color filter layer 203 and the black matrix grating 103. Because the thickness of the liquid crystal layer is usually 2.5~4 µm, and the thickness of the alignment layer is usually 700~1200 angstrom, so that a distance between the black matrix grating 103 and the color filter layer 203 can be restricted to a few microns. Thus, there is a larger angle between the light emitted from the opening area 32 of the black matrix grating 103 and the normal line of the opening area 32, which significantly reduces the crosstalk area, and a larger dual-visioning area can be obtained, i.e., the range of the left view area and the range of the right view area are increased.

In one embodiment, a thin film transisor unit, a first insulating layer, the color filter layer, a second insulating layer, and a pixel electrode layer are disposed on the lower base substrate 202 in sequence. Here, the thin film transisor unit, the first insulating layer, the second insulating layer and the pixel electrode can be formed in a conventional way, which is not repeated herein.

Further, based on the liquid crystal panel mentioned above according to an embodiment of the present disclosure, an embodiment of the present disclosure further provides a dual-vision liquid crystal display device comprising any one of the liquid crystal panels mentioned above.

Figure 6:
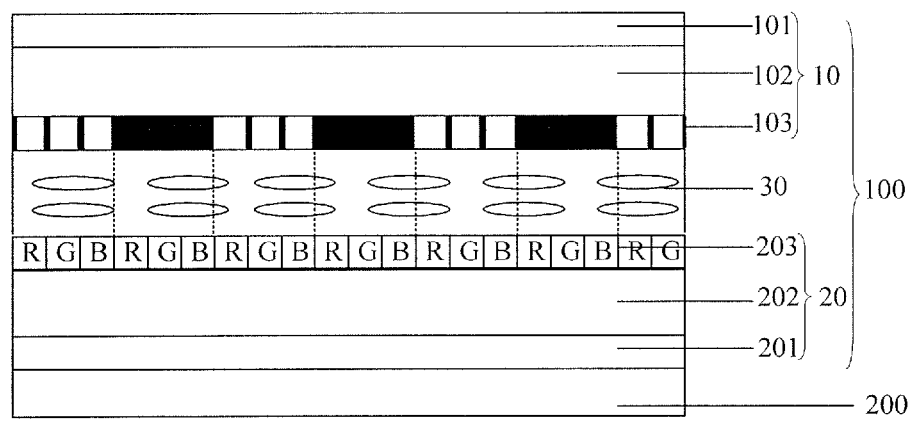
FIG. 6 is a structure schematic view of a dual-vision liquid crystal display device according to an embodiment of the present disclosure.

In one embodiment, an embodiment of the present disclosure provides a dual-vision liquid crystal display device. As shown in FIG. 6, the dual-vision liquid crystal display device comprises the liquid crystal panel 100 which is provided by an embodiment of the present disclosure; meanwhile, the dual-vision liquid crystal display device further comprises a backlight 200, and the back light 200 can be realized by a conventional way, for instance, implemetned in a side-emitting mode or a bottom-emitting mode, which is not repeated herein.

The structure of the dual-vision liquid crystal display device and the liquid crystal panel according to an embodiment of the present disclosure are described above; and next, a manufacturing method of the dual-vision liquid crystal display device and the liquid crystal panel according to an embodiment of the present disclosure will be described briefly below in connection with the figures.

Firstly, an opposing substrate and an array substrate are manufactured respectively.

In the processes of manufacturing the opposing substrate according to an embodiment of the present disclosure, the steps such as depositing, exposing, developing, etching, finalizing and the like are needed in manufacturing each layer.

Figure 7:
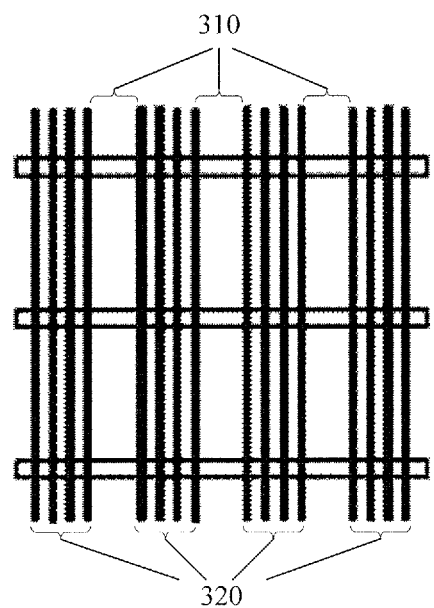
FIG. 7 is a structure schematic view of a mask for manufacturing the black matrix grating as shown in FIG. 5.

For example, in the steps of manufacturing the black matrix grating, a structure of a mask used in the exposing process is shown in FIG. 7. The structure of the mask comprises a transparent area 310 and a grating area 320. The shielding area 31 of the black matrix grating 103 is formed in the area corresponding to the transparent area 310 through exposing, developing, etching and finalizing; and the opening area 32 of the black matrix grating 103 is formed in the area corresponding to the grating area 320 through exposing, developing, etching and finalizing. Certainly, after the black matrix grating is manufactured, an alignment layer further needs to be formed on the black matrix grating. This step can be conducted in an existing way which is not repeated herein.

For example, the manufacturing process of the array substrate can applies a conventional way. For example, the technology that the color filter layer is manufactured on the array layer (Color filter On Array, COA) can be applied; or the color filter layer is manufactured on the lower base substrate.

Further, the opposing substrate and the array substrate are cell-assembled to form a liquid crystal panel.

Further, the liquid crystal panel and the backlight are assembled to form the dual-vision liquid crystal display device according to an embodiment of the present disclosure.

The structure and the manufacturing process of the dual-vision liquid crystal display device and the liquid crystal panel according to an embodiment of the present disclosure are described above; and next, the display principle of the dual-vision liquid crystal display device and the liquid crystal panel according to an embodiment of the present disclosure will be described briefly below in connection with the figures.

Figure 1:
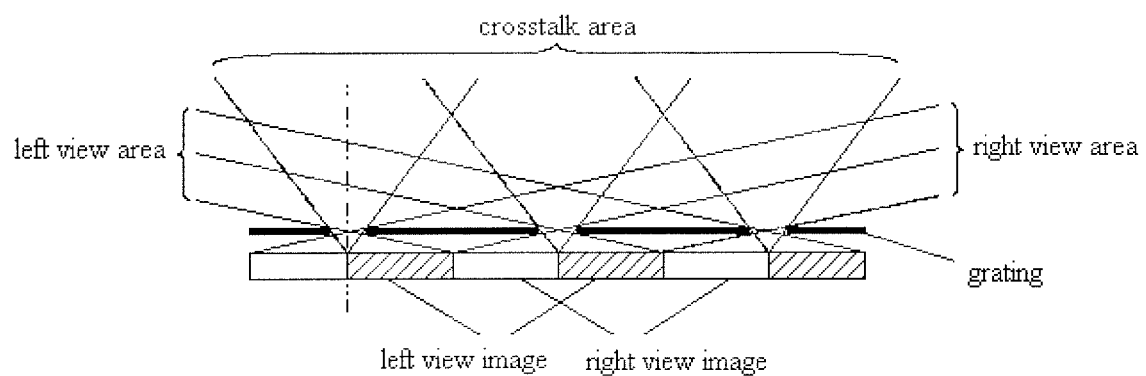
FIG. 1 is a principle schematic view of a dual-vision liquid crystal display device.
Figure 8:
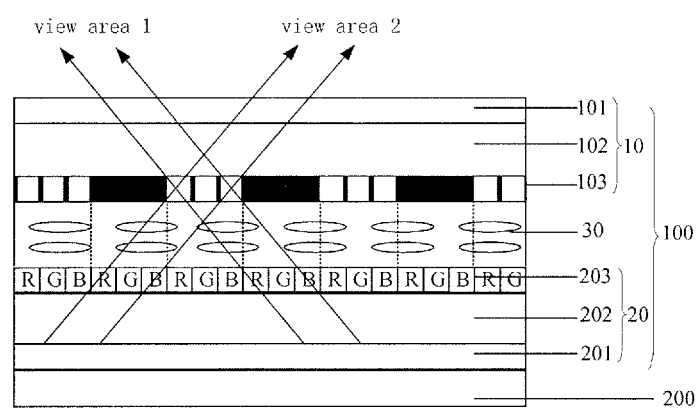
FIG. 8 is a schematic view of the light path when the dual-vision liquid crystal display device shown in FIG. 7 displays.

As shown in FIG. 8, the backlight 200 provides back light which passes through the array substrate 20 and the liquid crystal 30 and exits through the opening area 32 of the black matrix grating 103 on the opposing substrate, and thus a view area 1 and a view area 2 are generated at left and right sides respectively, that is, the left view area and the right view area. Compared with the FIG. 1, because only the liquid crystal layer is disposed between the color filter layer 203 and the black matrix grating 103, the distance between them is greatly reduced, and the angle between the exit light and the direction of normal line increases. Thus, the viewing angle of the dual-vision crystal display device is increased significantly, i.e., the left view area and the right view area are increased and the crosstalk area is reduced.

To sum up, the liquid crystal panel and the dual-vision liquid crystal display device according to an embodiment of the present disclosure do not need an extra transparent layer because a liquid crystal layer is disposed between the black matrix grating and the color filter layer, and thus reduce the thickness and the cost of the liquid crystal panel; in addition, because the thickness of the liquid crystal layer is small, the distance between the black matrix grating and the color filter layer is small, and the angle between the final exit light and the direction of normal line increases. Thus, the viewing angle of the dual-vision crystal display device is increased significantly.

What are described above is related to the illustrative embodiments of the disclosure only and not limitative to the scope of the disclosure; the scopes of the disclosure are defined by the accompanying claims.

The present application claims the priority of the Chinese Patent Application No. 201410325331.2 filed on Jul. 9, 2014, which is incorporated herein in its entirety by reference as part of the disclosure of the present application.

The invention claimed is:

1. A liquid crystal panel, wherein the liquid crystal panel comprises an opposing substrate, an array substrate, and a liquid crystal layer disposed between the opposing substrate and the array substrate;

wherein the opposing substrate comprises: an upper polarizer, an upper base substrate disposed on one side of the upper polarizer, which side faces the array substrate, a black matrix grating disposed on one side of the upper base substrate, which side faces the array substrate, and an alignment layer disposed between the black matrix grating and the liquid crystal layer and directly in contact with the black matrix grating;

the array substrate comprises: an lower polarizer, an lower base substrate disposed on one side of the lower polarizer, which side faces the opposing substrate, and a color filter disposed on one side of the lower base substrate, which side faces the opposing substrate, and the liquid crystal layer is disposed between the color filter layer and the black matrix grating.

2. The liquid crystal panel according to claim 1, wherein the array substrate comprises a plurality of pixel units defined by gate lines and data lines intersected with each other; the black matrix grating comprises a plurality of shielding areas and a plurality of opening areas arranged alternately, wherein the opening areas correspond to pixel units in odd columns or pixel units in even columns, and the shielding areas correspond to pixel units in even columns or pixel units in odd columns correspondingly.

3. The liquid crystal panel according to claim 2, wherein the pixel units comprise a plurality of sub-pixel units of different colors; each opening area further comprises a sub-shielding area disposed between adjacent sub-pixel units.

4. The liquid crystal panel according to claim 3, wherein a gate line shielding area is disposed on the black matrix grating at a location corresponding to a gate line of the array substrate.

5. The liquid crystal panel according to claim 1, wherein a distance between the color filter layer and the black matrix grating is 3 to 4 micrometers.

6. The liquid crystal panel according to claim 1, wherein a thin film transistor unit, a first insulating layer, the color filter layer, a second insulating layer, and a pixel electrode layer are disposed on the lower base substrate in sequence.

7. A dual-vision liquid crystal display device comprising the liquid crystal panel according to claim 1.

8. The liquid crystal panel according to claim 2, wherein a distance between the color filter layer and the black matrix grating is 3 to 4 micrometers.

9. The liquid crystal panel according to claim 2, wherein a thin film transistor unit, a first insulating layer, the color filter layer, a second insulating layer, and a pixel electrode layer are disposed on the lower base substrate in sequence.

10. The liquid crystal panel according to claim 3, wherein a distance between the color filter layer and the black matrix grating is 3 to 4 micrometers.

11. The liquid crystal panel according to claim 3, wherein a thin film transistor unit, a first insulating layer, the color filter layer, a second insulating layer, and a pixel electrode layer are disposed on the lower base substrate in sequence.

12. The liquid crystal panel according to claim 4, wherein a thin film transistor unit, a first insulating layer, the color filter layer, a second insulating layer, and a pixel electrode layer are disposed on the lower base substrate in sequence.

* * * * *